United States Patent
Choi et al.

(10) Patent No.: US 11,912,917 B2
(45) Date of Patent: Feb. 27, 2024

(54) QUANTUM DOTS CONTAINING MOLYBDENUM, NICKEL, AND SULFUR AND METHOD FOR MANUFACTURING SAME

(71) Applicant: AGENCY FOR DEFENSE DEVELOPMENT, Daejeon (KR)

(72) Inventors: Yu Song Choi, Daejeon (KR); Tae Young Ahn, Daejeon (KR); Min U Kim, Daejeon (KR); Jang Hyeon Cho, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/920,730

(22) PCT Filed: May 20, 2021

(86) PCT No.: PCT/KR2021/006254
§ 371 (c)(1),
(2) Date: Oct. 21, 2022

(87) PCT Pub. No.: WO2021/235851
PCT Pub. Date: Nov. 25, 2021

(65) Prior Publication Data
US 2023/0174856 A1    Jun. 8, 2023

(30) Foreign Application Priority Data

May 20, 2020  (KR) .................. 10-2020-0060619

(51) Int. Cl.
*C09K 11/68* (2006.01)
*C09K 11/60* (2006.01)
(Continued)

(52) U.S. Cl.
CPC .................. *C09K 11/68* (2013.01)

(58) Field of Classification Search
CPC ......... C09K 11/68; C09K 11/60; C09K 11/02; C09K 11/025; C04B 35/6268; C04B 35/62675
See application file for complete search history.

(56) References Cited

U.S. PATENT DOCUMENTS

| | | |
|---|---|---|
| 7,022,628 B2 | 4/2006 | Kim et al. |
| 10,113,109 B2 | 10/2018 | Gruhlke et al. |

(Continued)

FOREIGN PATENT DOCUMENTS

| | | |
|---|---|---|
| CN | 103681940 | 3/2014 |
| KR | 10-2005-0007661 | 1/2005 |

(Continued)

OTHER PUBLICATIONS

Martinez et al., "Magnetic and electrocatalytic properties of transition metal doped MoS2 nanocrystals", Oct. 17, 2018, Journal of Applied Physics, 124, pp. 153903-1 to 153906—(Year: 2018).*
International Search Report for PCT/KR2021/006254 dated Aug. 25, 2021 and its English translation from WIPO (now published as WO 2021/235851).
Written Opinion of the International Searching Authority for PCT/KR2021/006254 dated Aug. 25, 2021 and its English translation by Google Translate (now published as WO 2021/235851).

(Continued)

*Primary Examiner* — Matthew E. Hoban
*Assistant Examiner* — Lynne Edmondson
(74) *Attorney, Agent, or Firm* — Ladas & Parry, LLP

(57) ABSTRACT

A method of manufacturing quantum dots includes placing nickel powder having a certain particle size, a precursor material, and an organic solvent into a container, maintaining a pressure in the container at a certain value, and synthesizing quantum dots by stirring the nickel powder, the precursor material, and the organic solvent in the container.

8 Claims, 16 Drawing Sheets

(51) Int. Cl.
  *C09K 11/02* (2006.01)
  *C04B 35/626* (2006.01)

(56) References Cited

U.S. PATENT DOCUMENTS

2004/0092125 A1* 5/2004 Kim .................. C23C 14/5873
                                                              438/722
2019/0194556 A1* 6/2019 Safaei Mahmoudabadi ................
                                                              B01J 21/18

FOREIGN PATENT DOCUMENTS

KR  10-2016-0119149    10/2016
KR  10-2017-0000224    1/2017

OTHER PUBLICATIONS

Gu, Wei et al.: "A One-Step Synthesis of Water-Soluble MoS2 Quantum Dots via Hydrothermal Method as Fluorescent Probe for Hyaluronidase Detection", Applied Materials & Interfaces, Apr. 15, 2016, vol. 8., pp. 1-7.

Yang, Yanmei. et al.: "Nickel Nanoparticle/Carbon Quantum Dot hybrid as Efficient Electrocatalyst for Hydrogen Evolution under Alkaline Condition", Journal of Material Chemistry A 2015, vol. 3, pp. 1-7.

N. Thiyagarajan et al.: "Nanostructured Materials for Energy Related Applications", 2019, pp. 88-91.

Office Action dated Jun. 28, 2023 for Korean Patent Application No. 10-2021-0064629 and its English translation from Global Dossier.

* cited by examiner

QUANTUM DOTS CONTAINING MOLYBDENUM, NICKEL, AND SULFUR AND METHOD FOR MANUFACTURING SAME

TECHNICAL FIELD

The present disclosure relates to quantum dots including molybdenum, nickel, and sulfur and a method of manufacturing the quantum dots.

BACKGROUND ART

In general, since the first report in the 1980s, considerable progress has been made on research in the field of quantum dots for use in many studies and real-life applications. Currently, quantum dots are mainly used in high-resolution display devices in line with the smart era, and aggressive research has been carried out to develop high-performance and high-quality quantum dot devices to conquer the market. In particular, when it comes to a source material technology such as quantum dots, world-class electronic companies in many countries are struggling to secure the original source technology. In addition, research has been concentrated on high-efficiency and high-stability quantum dot photocatalysts for the production of electricity and hydrogen energy using solar cells and photoelectrochemical methods as alternative and renewable energy.

Examples of quantum dot materials that have been mainly developed and studied so far include group II-VI quantum dots such as cadmium (Cd) and selenium (Se), group III-V quantum dots such as indium phosphide (InP), non-Cd-based quantum dots composed of copper (Cu), indium (In), and sulfur (S), and carbon-based quantum dots such as graphene quantum dots. However, these quantum dots are toxic and have a number of problems that a process of manufacturing the quantum dots is complicated and it is difficult to manufacture quantum dots having uniform characteristics in large quantities.

Recently, a lot of researches have been done on various synthesis techniques that may solve these problems, and develop new materials for making quantum dots and methods for improving quantum efficiency and energy conversion efficiency. However, the researches and studies conducted by universities and laboratories still remain at the level of simply synthesizing a very small amount of nano-quantum dots, analyzing their properties, and publishing analysis results in academic journals.

These studies are mostly accompanied by economic and process complexity that requires the use of new expensive materials or special process and related equipment, and do not provide quantum dots having a higher yield, higher performance, economic feasibility, etc. compared to existing quantum dots.

DESCRIPTION OF EMBODIMENTS

Technical Problem

In order to solve the above problems, an object of the present disclosure is to provide economical quantum dots including molybdenum, nickel, and sulfur, a quantum dot catalyst, and a method of manufacturing the quantum dots that may be used in energy, display, pharmaceutical, and semiconductor fields. Specifically, the quantum dots are manufactured in large quantities through solvothermal synthesis with high pressure and stirring, by using nickel powder and a precursor material including molybdenum and sulfur.

Solution to Problem

According to an embodiment, a method of manufacturing quantum dots includes placing nickel powder having a certain particle size, a precursor material, and an organic solvent into a container, maintaining a pressure in the container at a certain value, and synthesizing quantum dots by stirring the nickel powder, the precursor material, and the organic solvent in the container.

According to another embodiment, there may be provided quantum dots that are manufactured by the method of manufacturing quantum dots and include molybdenum, nickel, and sulfur.

Advantageous Effects of Disclosure

According to a method of manufacturing quantum dots, according to embodiments, a significantly large amount of quantum dots including molybdenum, nickel, and sulfur may be economically synthesized.

Quantum dots including molybdenum, nickel, and sulfur, manufactured according to embodiments may be applied in energy, display, semiconductor, bio, imaging, laser, and memory fields.

BEST MODE

The certain particle size may be 10 μm or less.

The certain pressure may be 10 bar or more.

The precursor material may be ammonium tetrathiomolybdate ($(NH_4)_2MoS_4$).

The organic solvent may be dimethylformamide (DMF).

In the synthesizing, the nickel powder, the precursor material, and the organic solvent in the container may be stirred at a stirring speed of 200 rpm or more.

The method may further include heat-treating the synthesized quantum dots.

The heat-treating may include heating the synthesized quantum dots to at least a first temperature for at least a first time under an argon atmosphere, and heat-treating the synthesized quantum dots at the at least the first temperature for a second time greater than the first time under an argon atmosphere.

The first time may be 3 hours and the second time may be 5 hours.

The first temperature may be 500° C.

MODE OF DISCLOSURE

Specific embodiments of the present disclosure will now be described in detail with reference to the accompanying drawings. However, technical concepts of the present disclosure are not limited within the proposed embodiments. On the contrary, by addition of other constituting elements, change or deletion of the constituting elements from the present disclosure, another retrogressive disclosure or other embodiments that fall within the scope of the present disclosure can be easily suggested.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description of the disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Hereinafter, preferred embodiments of the present disclosure will be described in detail with reference to the accompanying drawings.

Figure 1:
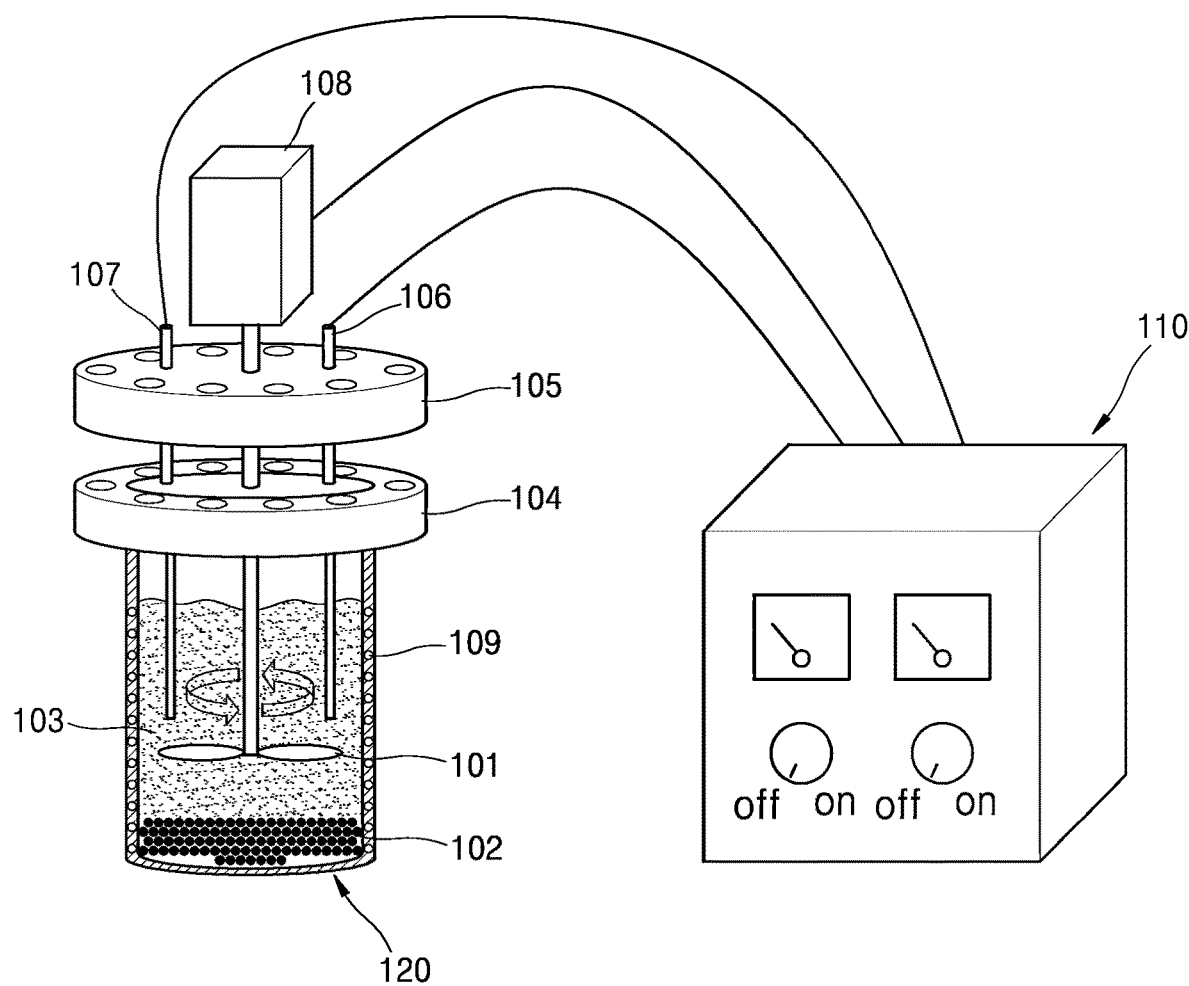
FIG. 1 is a view of an apparatus for manufacturing quantum dots including molybdenum, nickel, and sulfur, according to embodiments.

FIG. 1 is a view of an apparatus for manufacturing quantum dots including molybdenum, nickel, and sulfur, according to embodiments.

Quantum dots refer to particles having unique electrical and optical properties as the sizes of the particles decrease to a few nm level. Quantum dots may be used as materials in the fields of electronic component memories, quantum computers, semiconductors, lasers, optical amplifiers, displays, solar cells, energy, bio, and imaging.

According to embodiments, an apparatus and method for manufacturing quantum dots and quantum dot catalysts including molybdenum, nickel, and sulfur, which secure economical efficiency, have excellent quality, and may be synthesized in large quantities, may be provided.

Referring to FIG. 1, the apparatus for manufacturing quantum dots including molybdenum, nickel, and sulfur may include a container 120 and a controller 110.

The controller 110 may heat a material inside the container 120 by controlling the power supplied to a heating wire 109. By controlling the operation of a motor 108, the controller 110 may rotate an impeller 101 connected to the motor 108 and stir the material inside the container 120. The controller 110 may be connected to a pressure sensor 106 and a temperature sensor 107 to measure the pressure and temperature inside the container 120.

The container 120 may include a lower reaction container 104 and an upper reaction container 105. A solvent 103 may be accommodated in the container 120, and a nickel powder 102 may be impregnated in the solvent 103.

In order to prepare quantum dots including molybdenum, nickel, and sulfur, acetone and hydrochloric acid having a concentration of 1M may be used to pre-treat the nickel powder 102 and to remove organic and oxides on the surface of the nickel powder 102.

Thereafter, a precursor material may be mixed with an organic solvent so that quantum dots including nickel, molybdenum, and sulfur may be synthesized. For example, the precursor material may be ammoniumtetrathiomolybdate $(NH_4)_2MoS_4$. For example, the organic solvent may be dimethylformamide (DMF). In this case, a precursor solution having a concentration of 10 mM to 1M $(NH_4)_2MoS_4$ may be used. In some embodiments, in order to increase the loading of quantum dots, the ratio of $(NH_4)_2MoS_4$ mixed with DMF may be increased.

Thereafter, the nickel powder 102 may be put into the container 120 so that the nickel powder 102 is completely immersed in the solvent. The size of the nickel powder particles may vary from 250 μm or less to several tens of nm. The nickel powder particles may have various shapes, such as a spherical shape, a flake shape, or an irregular shape.

According to embodiments, a nickel power having a particle size of 250 μm or less is used, and the nickel powder may be a fine powder with a purity of 99% or more. The finer the size of the nickel powder particles, the denser quantum dots including molybdenum, nickel, and sulfur may be synthesized.

Thereafter, the container 120 may be completely sealed by a case. In this case, the container 120 may be a pressure-resistant solvothermal synthesis container to withstand a pressure of 30 bar or more. The material of the container 120 may include Teflon or stainless steel (SUS).

The container 120 may be fastened by the case so that the container 120 is completely sealed so that the pressure in the container 120 does not decrease at a pressure of 30 bar or less during a solvothermal synthesis process. The case may be made of a stainless material. The pressure sensor 106 may measure pressure inside the container 120 during the synthesis process.

The controller 110 may perform solvothermal synthesis while heating the container 120. The temperature sensor 107 may measure internal temperature of the container 120 during the synthesis process, and the controller 110 may control the internal temperature of the container 120. According to embodiments, performing solvothermal synthesis may include a plurality of operations. First, internal temperature of the container 120 may be raised to 200° C. for 1 hour. After the internal temperature of the container 120 is maintained at 200° C. for more than 12 hours, the container 120 may be naturally cooled.

Also, the controller 110 may heat-treat the synthesized quantum dots by heating the container 120. According to embodiments, performing the heat treatment may include a plurality of operations. First, the container 120 in which synthesized quantum dots including molybdenum, nickel, and sulfur are present may be filled with an argon atmosphere, and internal temperature of the container 120 may be raised to 500° C. for 3 hours. After the internal temperature of the container 120 is maintained at 500° C. for more than 5 hours, the container may be naturally cooled.

Figure 2A:
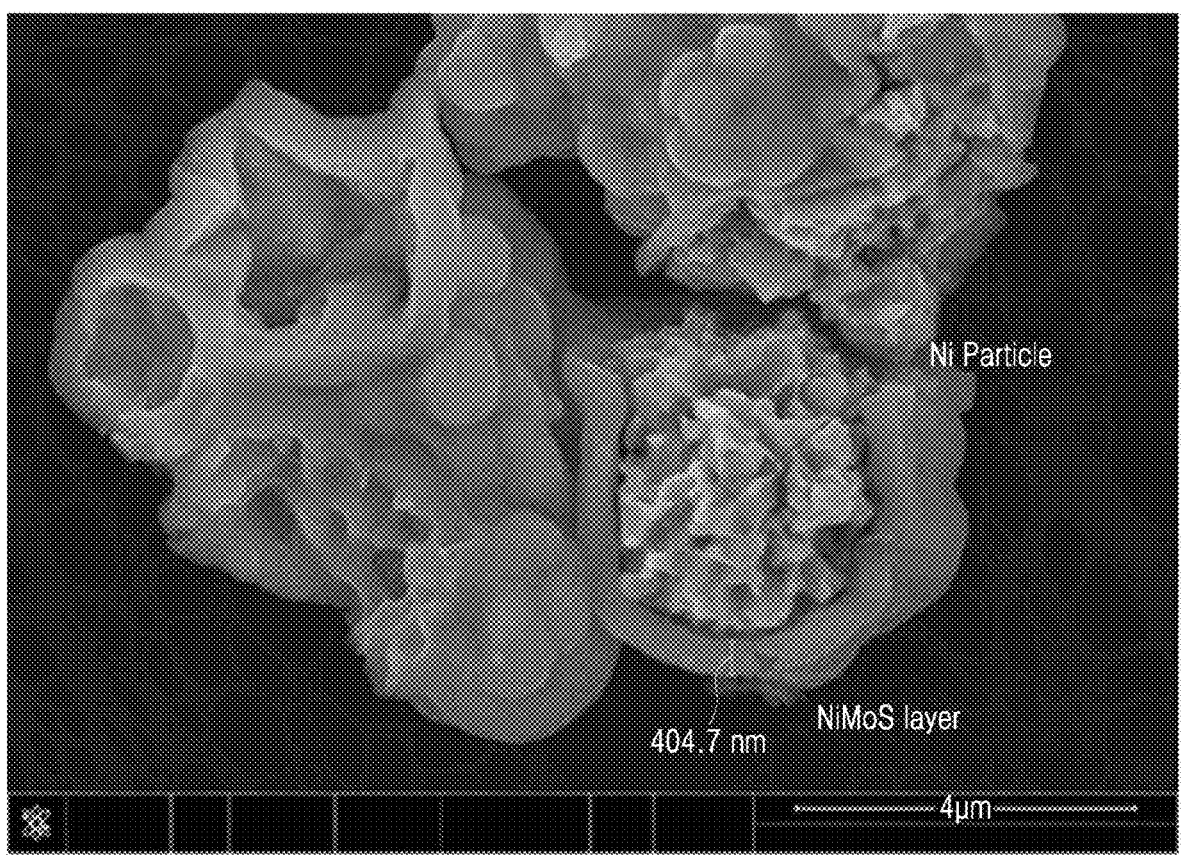
FIGS. 2A and 2B illustrate scanning electron microscope (SEM) image and selected area electron diffraction (SAED) analysis results of quantum dots including molybdenum, nickel, and sulfur, manufactured according to a comparative example.
Figure 2B:
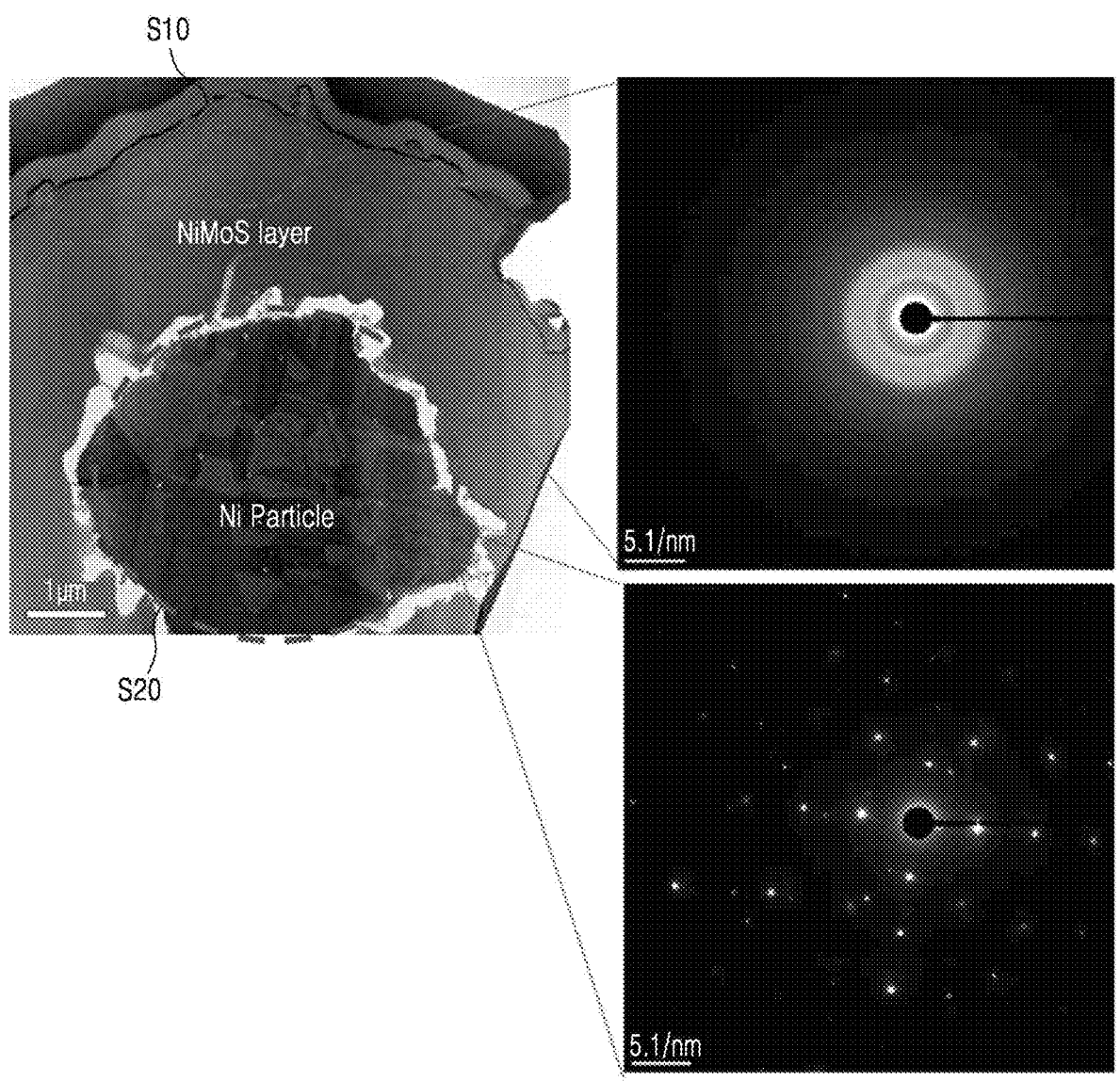

FIGS. 2A and 2B illustrate scanning electron microscope (SEM) image and selected area electron diffraction (SAED) analysis results of quantum dots including molybdenum, nickel, and sulfur, manufactured according to a comparative example.

Quantum dots or quantum dot catalysts according to the comparative examples are synthesized without stirring at a low pressure of 2 bar to 3 bar in a container in which molybdenum, nickel, and sulfur are put.

Referring to FIG. 2A illustrating an SEM image of quantum dots including molybdenum, nickel, and sulfur according to a comparative example, a central portion S20 maintains the shape and size of a nickel powder (Ni particles) used for synthesis.

It may be seen that a synthesized quantum dot layer (NiMoS layer) including molybdenum, nickel, and sulfur is formed with a size of about 407 nm on the outside of the nickel powder.

Referring to FIG. 2B illustrating a SEAD analysis result of quantum dots including molybdenum, nickel, and sulfur according to the comparative example, the central portion S20 in which the nickel powder (Ni particles) is located exhibits a very high level of crystalline phase as before synthesis. On the other hand, in the case of quantum dots including molybdenum, nickel, and sulfur, synthesized on the outside S10 of the nickel powder, a specific crystal component is not be checked on SAED.

That is, according to the comparative example, when quantum dots are synthesized at a low pressure of about 2 bar to about 3 bar, the nickel powder maintains the shape and size before synthesis, and amorphous quantum dots including molybdenum, nickel, and sulfur are synthesized on the outside S10 of the nickel powder.

Figure 3:
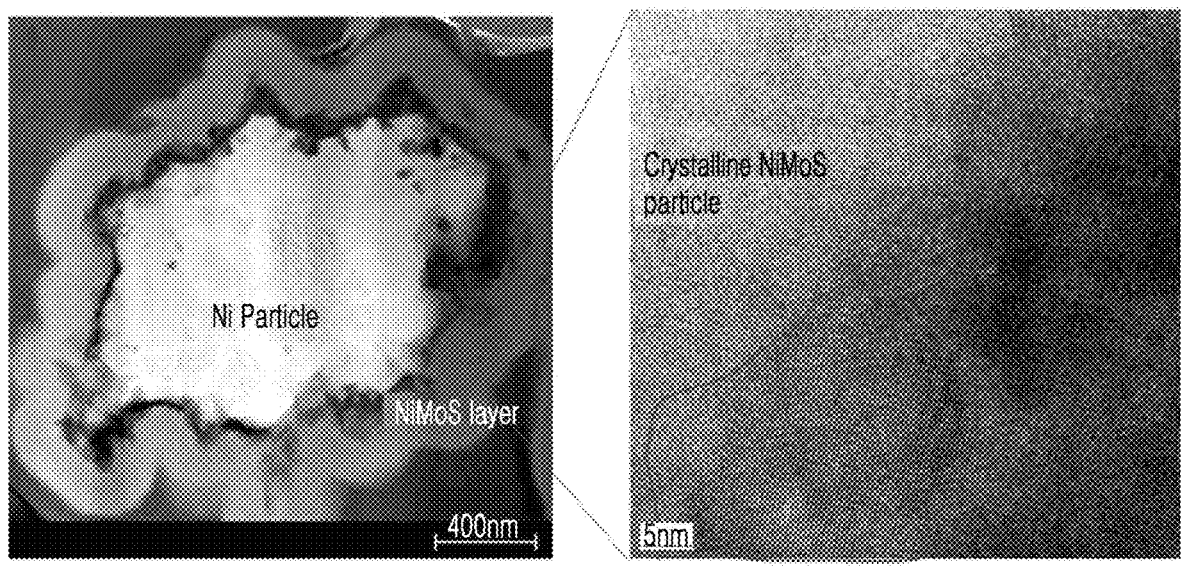
FIG. 3 illustrates a transmission electron microscope (TEM) analysis result of quantum dots including molybdenum, nickel, and sulfur, synthesized according to the first embodiment.

FIG. 3 illustrates a transmission electron microscope (TEM) analysis result of quantum dots including molybdenum, nickel, and sulfur, synthesized according to a first embodiment. Referring to FIG. 3, TEM measurement results of quantum dots including molybdenum, nickel, and sulfur, synthesized according to the first embodiment, may be confirmed.

In the case of the first embodiment, nickel powder having a particle size of 250 μm or less is used. In the case of the first embodiment, a pressure of about 7 bar is maintained. In the case of the first embodiment, stirring is performed during synthesis.

Referring to FIG. 3, when a pressure of about 7 bar is applied and stirring is performed during synthesis, the size of the nickel powder is reduced to about 800 nm.

In addition, it may be confirmed that, around the nickel powder (Ni particles), the synthesized quantum dots including molybdenum, nickel, and sulfur are present in the form of crystalline particles (i.e., crystalline NiMoS particles) having a size of several tens of nm.

Figure 4:
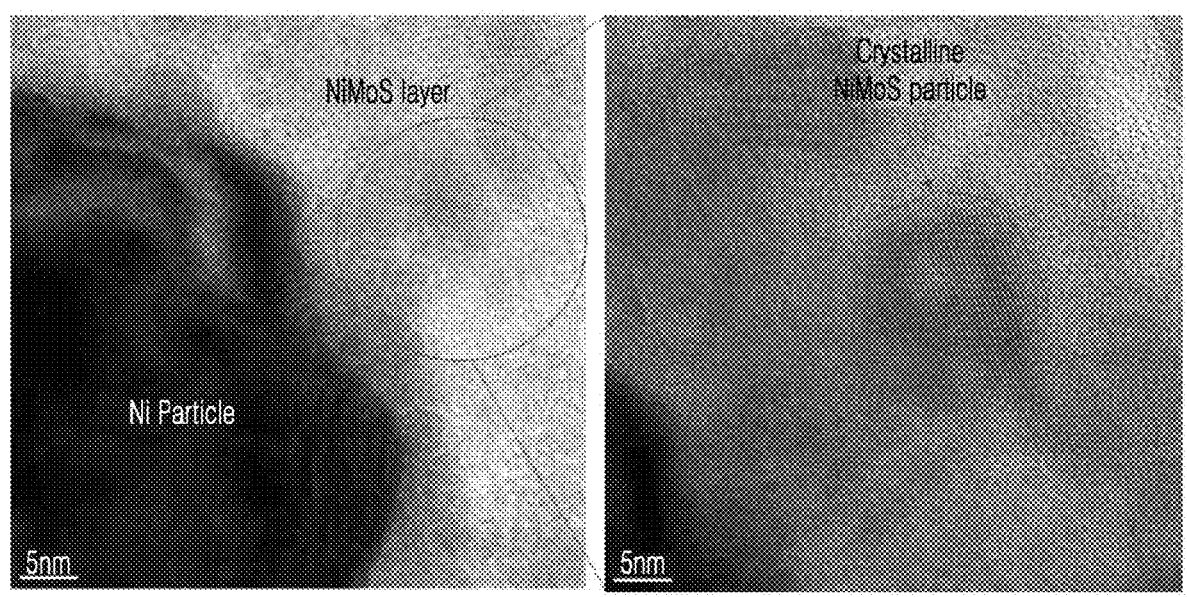
FIG. 4 illustrates a TEM analysis result of quantum dots including molybdenum, nickel, and sulfur, synthesized according to the second embodiment.

FIG. 4 illustrates a TEM analysis result of quantum dots including molybdenum, nickel, and sulfur, synthesized according to the second embodiment. Referring to FIG. 4, TEM measurement results of quantum dots including molybdenum, nickel, and sulfur, synthesized according to the second embodiment, may be confirmed.

In the case of the second embodiment, the particle size of a nickel powder is about 250 μm or less. In the case of the second embodiment, stirring is performed during synthesis while maintaining a pressure of about 15 bar.

Referring to FIG. 4, it may be confirmed that the size of crystalline particles (i.e., crystalline NiMoS particles) of quantum dots including molybdenum, nickel, and sulfur, synthesized around the nickel powder (Ni particles), is greatly reduced compared to the first embodiment and quantum dots having a particle size of about 10 nm to about 20 nm are present outside the nickel powder in the form of crystalline particles.

According to the second embodiment compared to the first embodiment, although nickel powder having the same particle size is used, as the pressure is increased from 7 bar to 15 bar during a solvothermal synthesis process, the size of the crystalline particles of the quantum dots including molybdenum, nickel, and sulfur, synthesized around the nickel powder, decreases.

Figure 5:
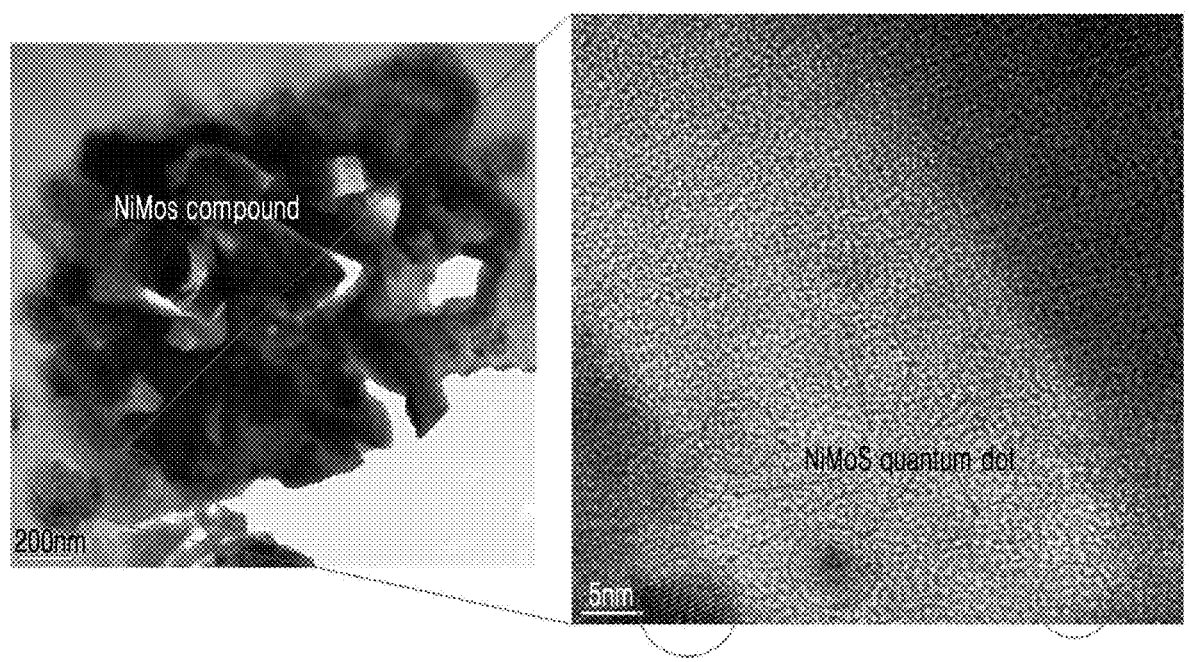
FIG. 5 illustrates a TEM analysis result of quantum dots including molybdenum, nickel, and sulfur, synthesized according to the third embodiment.

FIG. 5 illustrates a TEM analysis result of quantum dots including molybdenum, nickel, and sulfur, synthesized according to a third embodiment. Referring to FIG. 5, TEM measurement results of quantum dots including molybdenum, nickel, and sulfur, synthesized according to the third embodiment, may be confirmed.

In the case of the third embodiment, the particle size of a nickel powder is about μm or less. In the case of the third embodiment, stirring is performed during synthesis while maintaining a pressure of about 15 bar.

Referring to FIG. 5, it may be confirmed that a large amount of quantum dots (NiMoS quantum dots) including molybdenum, nickel, and sulfur of 10 nm or less are present in a quantum dot layer including molybdenum, nickel, and sulfur, synthesized around the nickel powder.

According to the third embodiment compared to the second embodiment, as the particle size of the nickel powder becomes finer, nickel is finely decomposed into more nickel molecules in a solvothermal synthesis process. Accordingly, active reaction of a precursor occurs during high-temperature, high-pressure, and stirring solvothermal synthesis. Therefore, large amounts of quantum dots including molybdenum, nickel, and sulfur may be synthesized.

According to the comparative example, an amorphous quantum dot layer including molybdenum, nickel, and sulfur, which has a thickness of several hundred nm, may be formed while the nickel powder maintains the shape before synthesis.

On the other hand, when solvothermal synthesis is performed by putting fine nickel powder in a high pressure of 10 bar or more and stirring environment as in the embodiments, quantum dots including molybdenum, nickel, and sulfur may be synthesized in large quantities.

Figure 6:
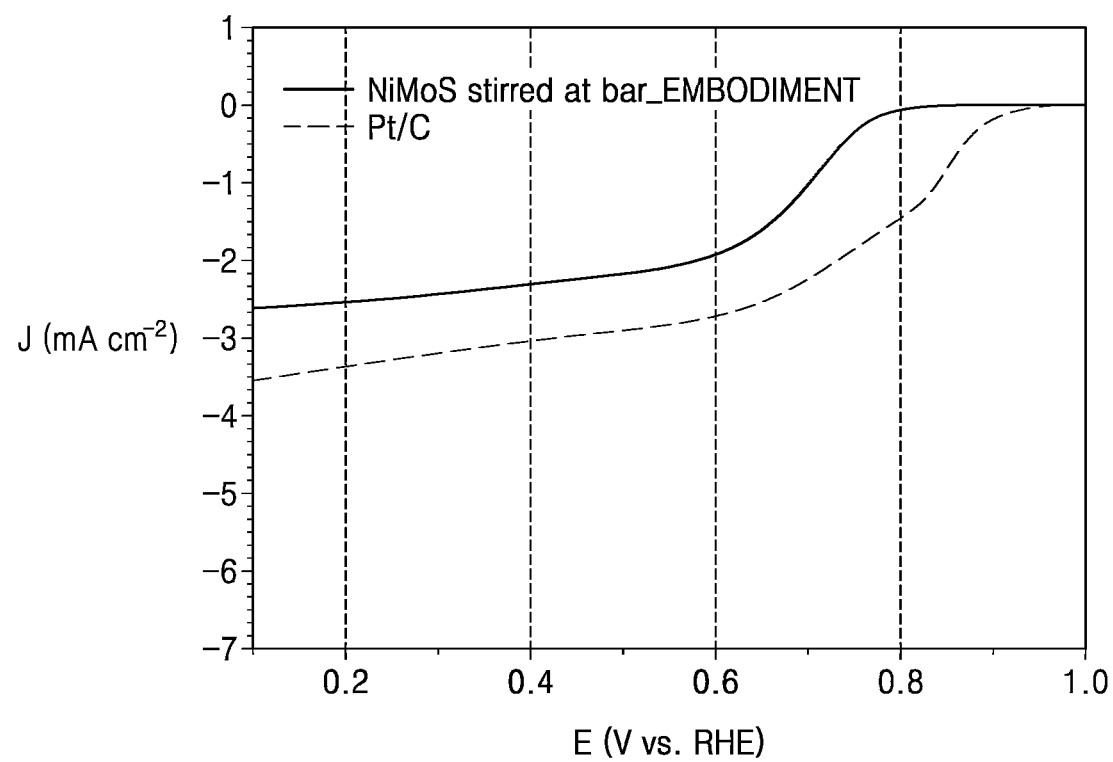
FIGS. 6 and 7 illustrate ring rotating disk electrode (RRDE) measurement results of oxygen evolution reaction (OER) of quantum dot catalysts including molybdenum, nickel, and sulfur, manufactured according to an embodiment and a comparative example.
Figure 7:
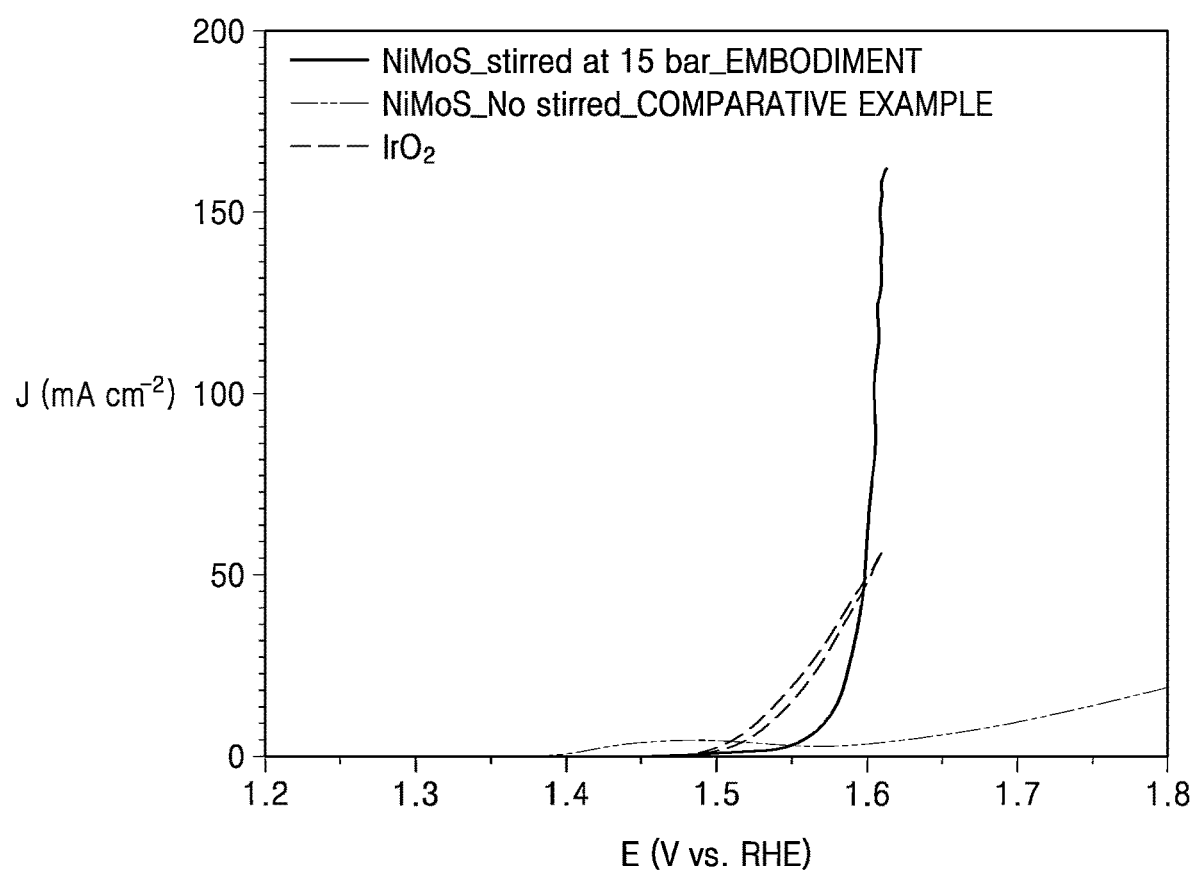

FIGS. 6 and 7 illustrate ring rotating disk electrode (RRDE) measurement results of oxygen evolution reaction (OER) of quantum dot catalysts including molybdenum, nickel, and sulfur, manufactured according to an embodiment of the present disclosure and a comparative example.

Quantum dots including molybdenum, nickel, and sulfur, manufactured according to the embodiment and the comparative example, may function as an efficient catalyst in an OER.

In the case of the embodiment, compared with platinum/carbon (Pt/C), which is currently commercially available and known to exhibit excellent OER characteristics, OER characteristics are relatively excellent.

Referring to FIG. 6, in the case of Pt/C, an OER on-set voltage starts at about (V vs. reversible hydrogen electrode (RHE)). In the case of the quantum dot catalyst including molybdenum, nickel, and sulfur, synthesized according to the embodiment, the OER on-set voltage is about 0.8 V (V vs. RHE), which is about 0.1V higher than the OER on-set voltage of Pt/C.

For Pt/C, the exchange current density is measured to be about 3.5 mA/cm 2 at 0.1V. The quantum dot catalyst including molybdenum, nickel, and sulfur, synthesized according to the embodiment, exhibits an excellent exchange current density value of about 2.7 mA/cm 2 at 0.1 V.

Referring to FIG. 7, the oxygen reduction reaction (ORR) of a quantum dot catalyst including molybdenum, nickel, and sulfur, synthesized through an embodiment, is 1.5V to 1.55V (V vs. RHE), which is an on-set voltage almost similar to that of a commercial $IrO_2$ catalyst.

In the case of the exchange current density, commercial catalyst $IrO_2$ exhibits an exchange current density value of about 60 mA/cm 2 at 1.6V (V vs. RHE). In the case of the quantum dot catalyst including molybdenum, nickel, and sulfur, synthesized according to the embodiment, an exchange current density of 180 mA/cm 2 is about three times an exchange current density of $IrO_2$.

In addition, it may be confirmed that the quantum dot catalyst synthesized according to the comparative example has a disadvantageous ORR characteristic compared to the embodiment. Accordingly, quantum dots synthesized according to a solvent synthesis method including a stirring operation at high pressure according to embodiments have the effect of improving a catalytic reaction in an OER/ORR reaction.

Figure 8:
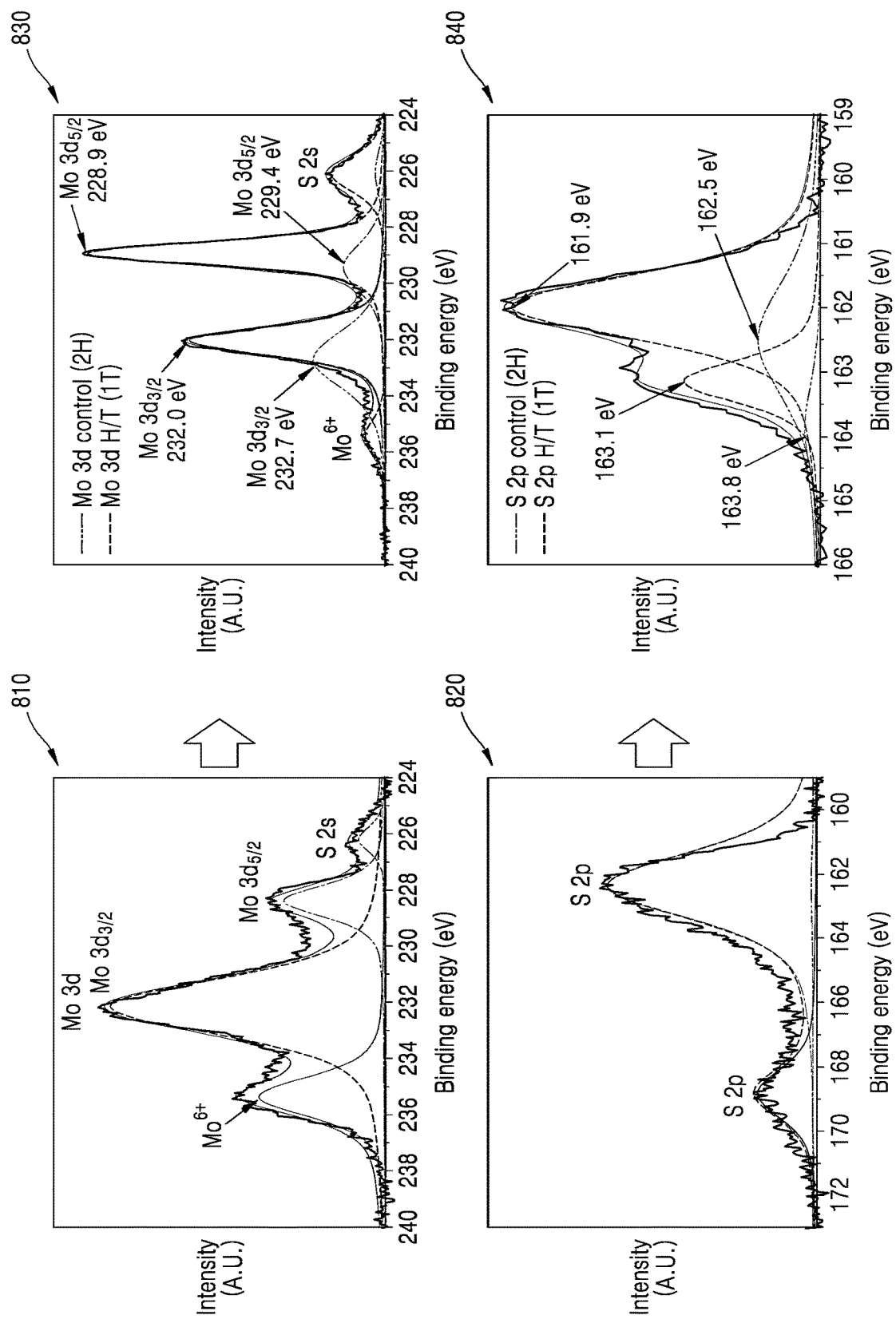
FIG. 8 illustrates X-ray photoelectron spectroscopy (XPS) analysis results before and after heat treatment of quantum dots including molybdenum, nickel, and sulfur, manufactured according to an embodiment.

FIG. 8 illustrates X-ray photoelectron spectroscopy (XPS) analysis results before and after heat treatment of quantum dots including molybdenum, nickel, and sulfur, manufactured according to an embodiment. Graphs 810 and 820 correspond to XPS analysis results before heat treatment of quantum dots including molybdenum, nickel, and sulfur, manufactured according to the embodiment, and graphs 830 and 840 correspond to XPS analysis results after heat treatment of quantum dots including molybdenum, nickel, and sulfur, manufactured according to the embodiment.

In an embodiment, synthesized quantum dots may be heat-treated. The synthesized quantum dots may be heated to at least a first temperature for at least a first time under an argon atmosphere, and heat-treated at the at least the first temperature for a second time greater than the first time. For example, the first time may be 3 hours, and the second time may be 5 hours. Also, for example, the first temperature may be 500° C. However, the present disclosure is not necessarily limited thereto.

Referring to FIG. 8, Mo $3d_{3/2}$ and Mo $3d_{5/2}$ peaks of the quantum dots including molybdenum, nickel, and sulfur after heat treatment are shifted in a low binding energy direction. This shift to low binding energy occurs when the crystal structure of molybdenum is changed from 2H (trigonal) to 1T (hexagonal). Accordingly, the molybdenum crystal structure of quantum dots including molybdenum, nickel, and sulfur may be changed from 2H (trigonal) to 1T (hexagonal) by heat treatment. As the crystal structure of molybdenum is changed from 2H (trigonal) to 1T (hexagonal), catalytic properties at the edges and surfaces of the quantum dots may be improved and the conductivity of the quantum dots may be improved, and thus, the catalytic properties of the quantum dots may be improved. In addition, an S 2P peak is also shifted in the direction of low binding energy, and this shift indicates that the crystal structure of the quantum dots including molybdenum, nickel, and sulfur is changed from 2H (trigonal) to 1T (hexagonal) by heat treatment.

Figure 9:
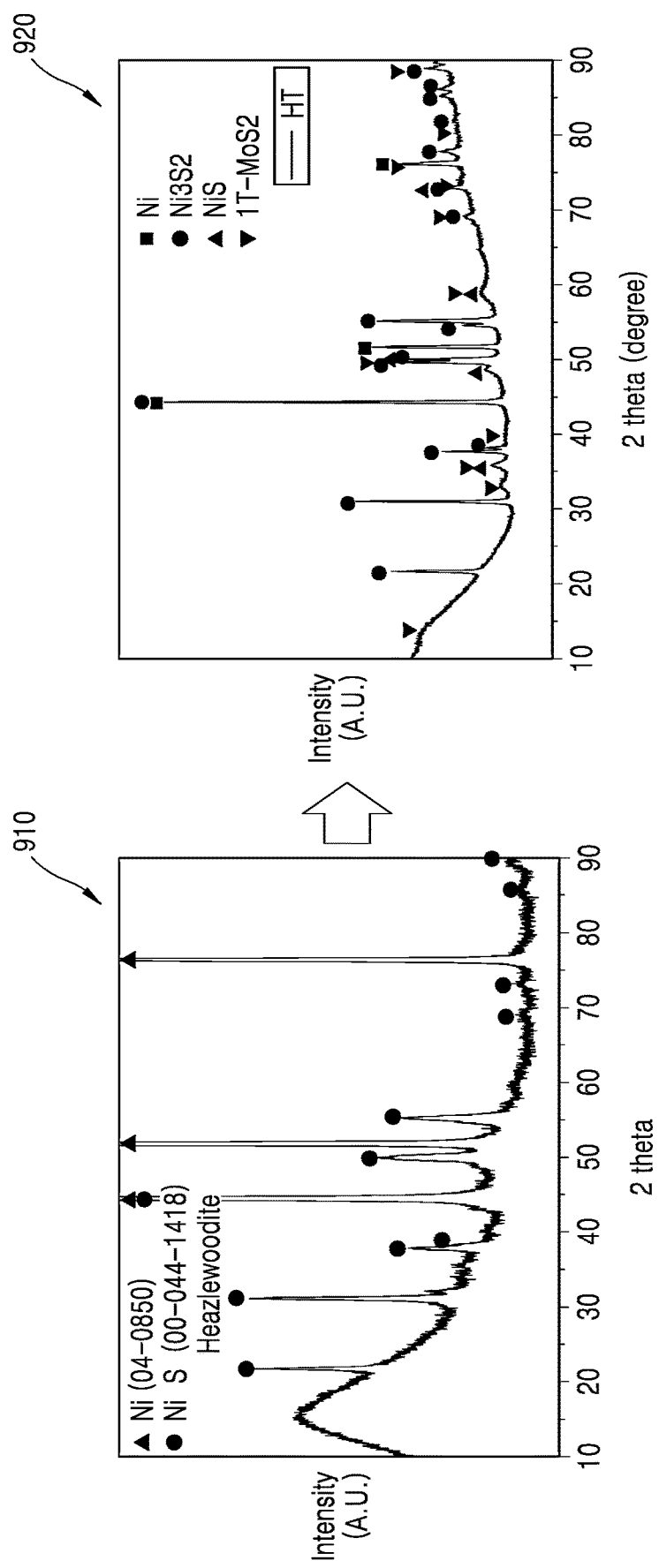
FIG. 9 illustrates X-ray diffraction (XRD) analysis results before and after heat treatment of a quantum dot catalyst including molybdenum, nickel, and sulfur, manufactured according to an embodiment.

FIG. 9 illustrate X-ray diffraction (XRD) analysis results before and after heat treatment of a quantum dot catalyst including molybdenum, nickel, and sulfur, manufactured according to an embodiment. A graph 910 corresponds to an XRD analysis result before heat treatment of the quantum dot catalyst including molybdenum, nickel, and sulfur, manufactured according to the embodiment, and a graph 920 corresponds to an XRD analysis result after heat treatment of the quantum dot catalyst including molybdenum, nickel, and sulfur, manufactured according to the embodiment.

Referring to FIG. 9, after the heat treatment, Ni peaks are reduced in the quantum dots including molybdenum, nickel, and sulfur, and $Ni_3S_2$, NiS, and 1T $MoS_2$ peaks are observed in the quantum dots. Accordingly, a $Ni_3S_2$ crystal structure of the quantum dots is grown by heat treatment, and the crystal structure of molybdenum may be changed from 2H (trigonal) to 1T (hexagonal). In addition, a crystal structure inside the quantum dot catalyst may be confirmed through XRD, and in the heat-treated quantum dot catalyst including molybdenum, nickel, and sulfur, a molybdenum crystal structure inside the heat-treated catalyst is also changed to 1T (hexagonal).

Figure 10:
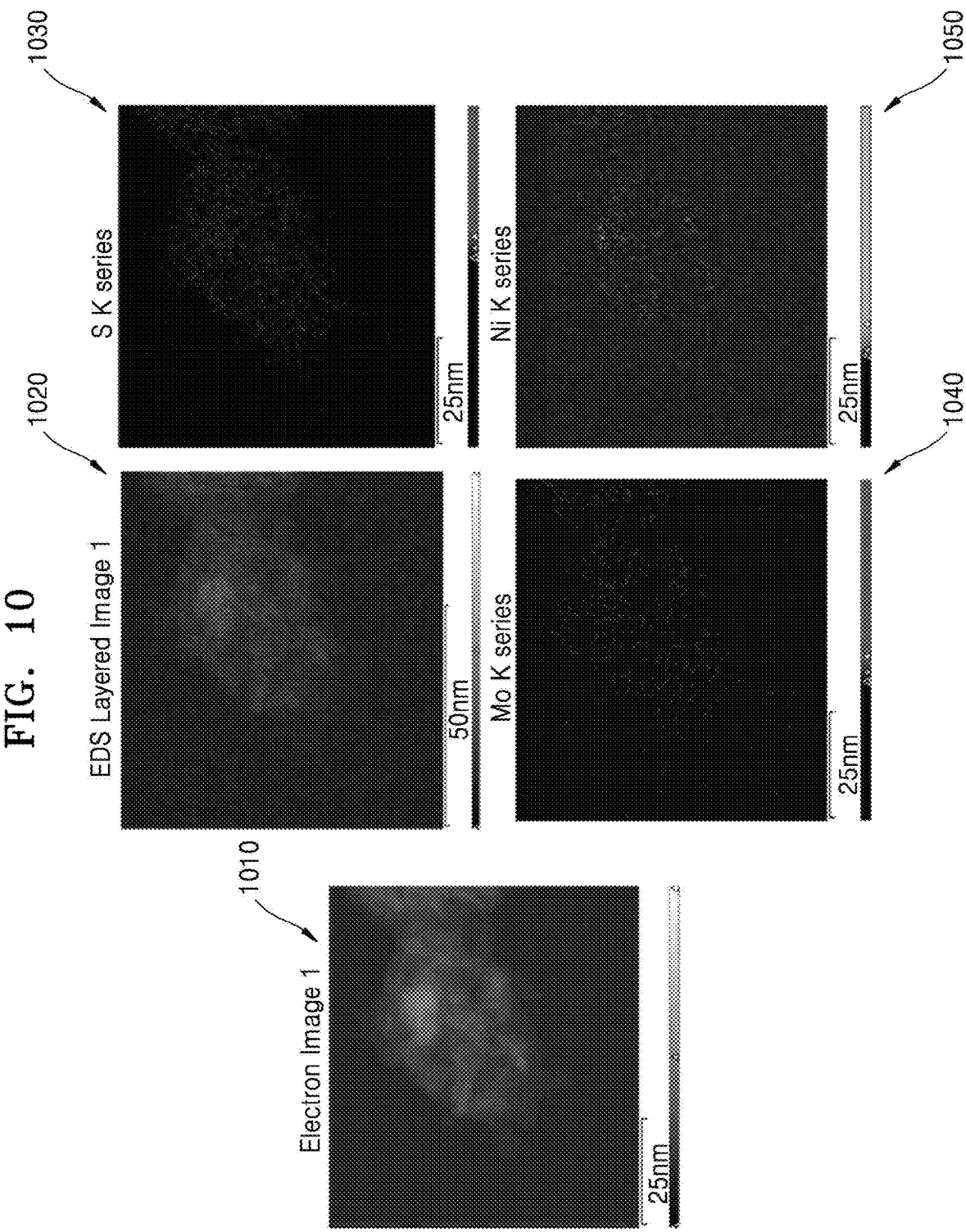
FIG. 10 illustrates energy dispersive X-ray spectroscopy (EDS) mapping results of a TEM obtained for a heat-treated quantum dot catalyst including molybdenum, nickel, and sulfur, manufactured according to an embodiment.

FIG. 10 illustrates energy dispersive X-ray spectroscopy (EDS) mapping results of a TEM obtained for a heat-treated quantum dot catalyst including molybdenum, nickel, and sulfur, manufactured according to an embodiment. An image 1010 corresponds to an electron image, and an image 1030 corresponds to an EDS mapping result of sulfur. In addition, an image 1040 corresponds to an EDS mapping result of molybdenum, and an image 1050 corresponds to an EDS mapping result of nickel. An Image 1020 corresponds to an EDS mapping result of sulfur, molybdenum, and nickel.

Referring to FIG. 10, after heat treatment, in the quantum dots including molybdenum, nickel, and sulfur, molybdenum, nickel, and sulfur may be uniformly distributed throughout a quantum dot catalyst.

Figure 11:
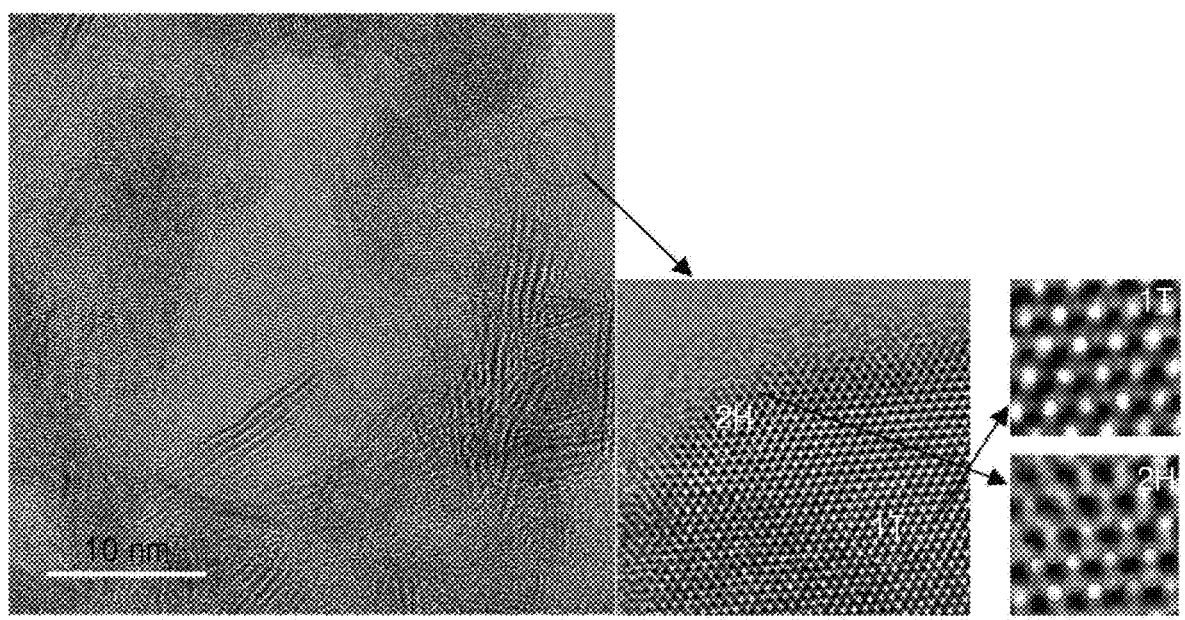
FIG. 11 illustrates a TEM analysis result of heat-treated quantum dots including molybdenum, nickel, and sulfur, synthesized according to an embodiment.

FIG. 11 illustrates a TEM analysis result of heat-treated quantum dots including molybdenum, nickel, and sulfur, synthesized according to an embodiment.

Referring to FIG. 11, after heat treatment, all quantum dots including molybdenum, nickel, and sulfur are changed to a crystalline phase. Before heat treatment, quantum dots including molybdenum, nickel, and sulfur exhibit a crystalline phase only in part, but by heat treatment, all of the amorphous phases of the quantum dots including molybdenum, nickel, and sulfur develop into crystalline phases. When the crystalline phase of the quantum dots including molybdenum, nickel, and sulfur is developed, the quantum dots have a 2H (trigonal) crystal structure at the interface. However, the crystal structure of the quantum dots is changed to a 1T (hexagonal) crystal structure through the sliding of elements constituting the quantum dots.

FIGS. 12A to 12D illustrate hydrogen evolution reaction (HER), OER, ORR, and potential difference between OER and ORR ($E_{OER}$-$E_{ORR}$) measurement results before and after heat treatment of a quantum dot catalyst including molybdenum, nickel, and sulfur, manufactured according to an embodiment.

Figure 12A:
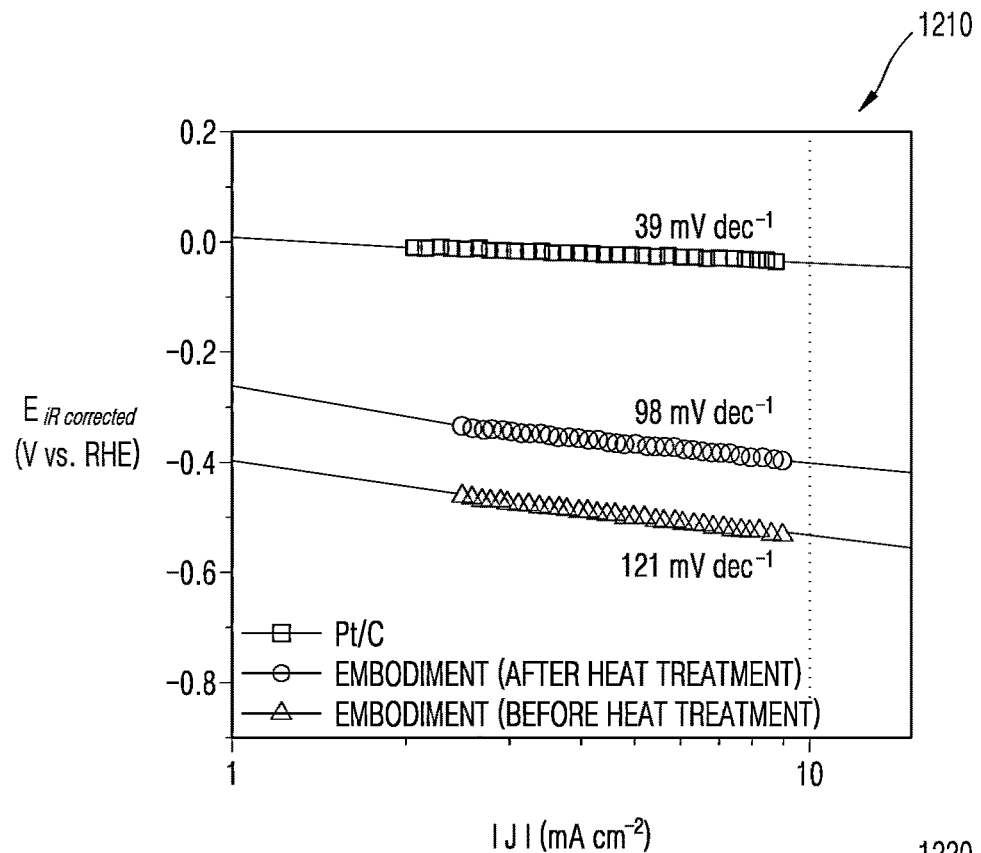
FIGS. 12A to 12D illustrate hydrogen evolution reaction (HER), oxygen evolution reaction (OER), oxygen reduction reaction (ORR), and potential difference between OER and ORR ($E_{OER}$-$E_{ORR}$) measurement results before and after heat treatment of a quantum dot catalyst including molybdenum, nickel, and sulfur, manufactured according to an embodiment.
Figure 12A:
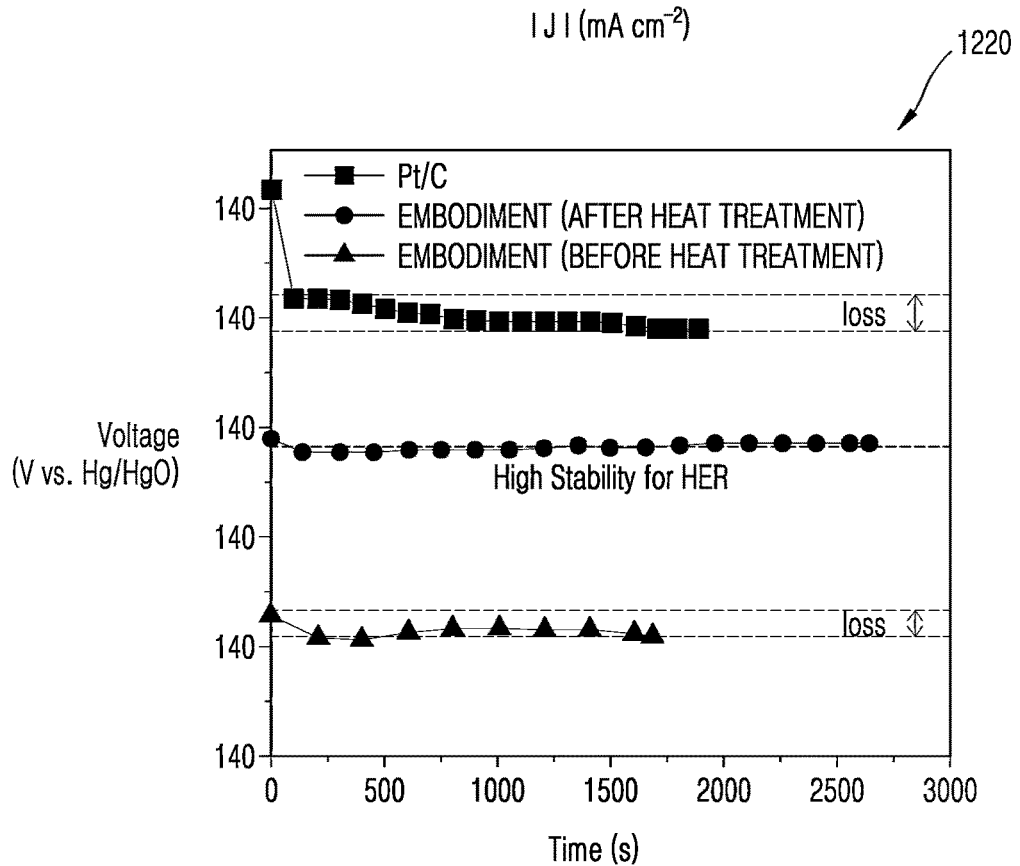
Figure 12B:
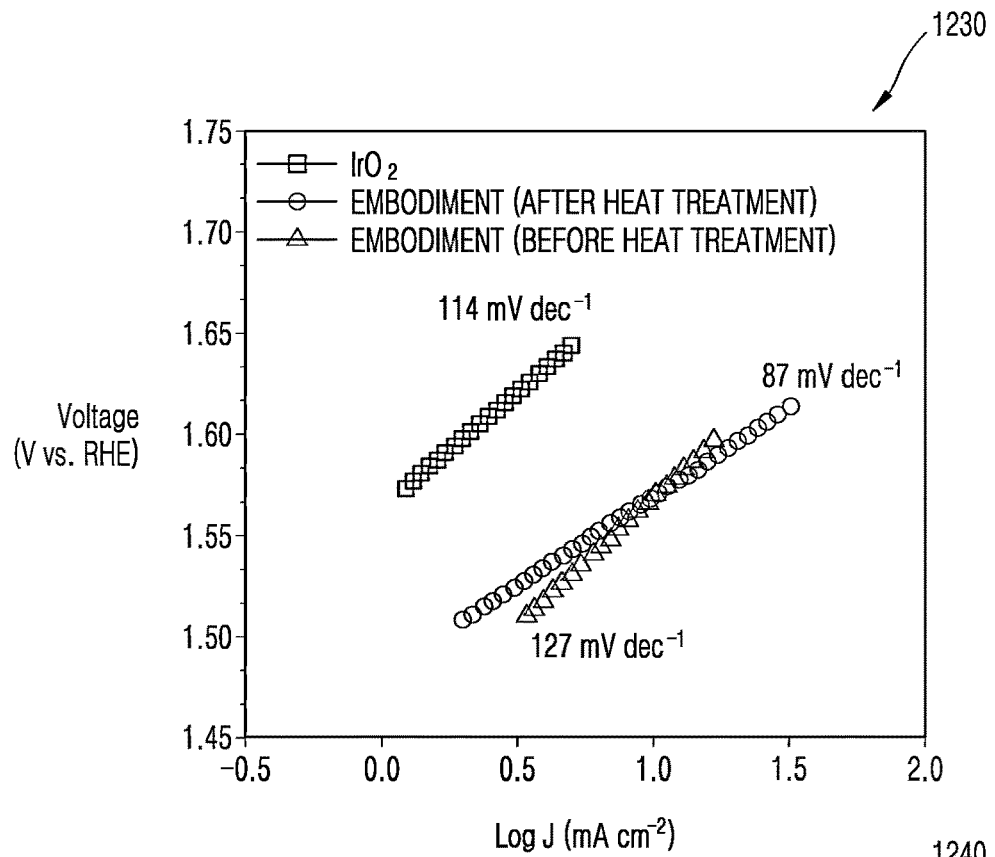
Figure 12B:
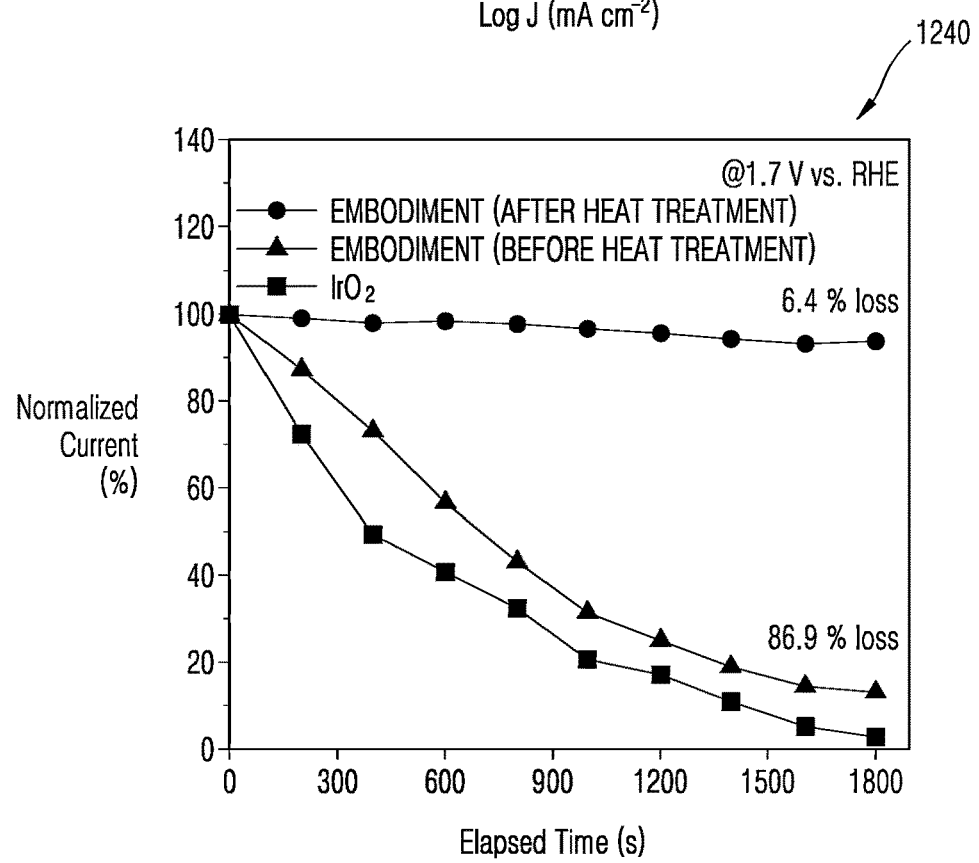
Figure 12C:
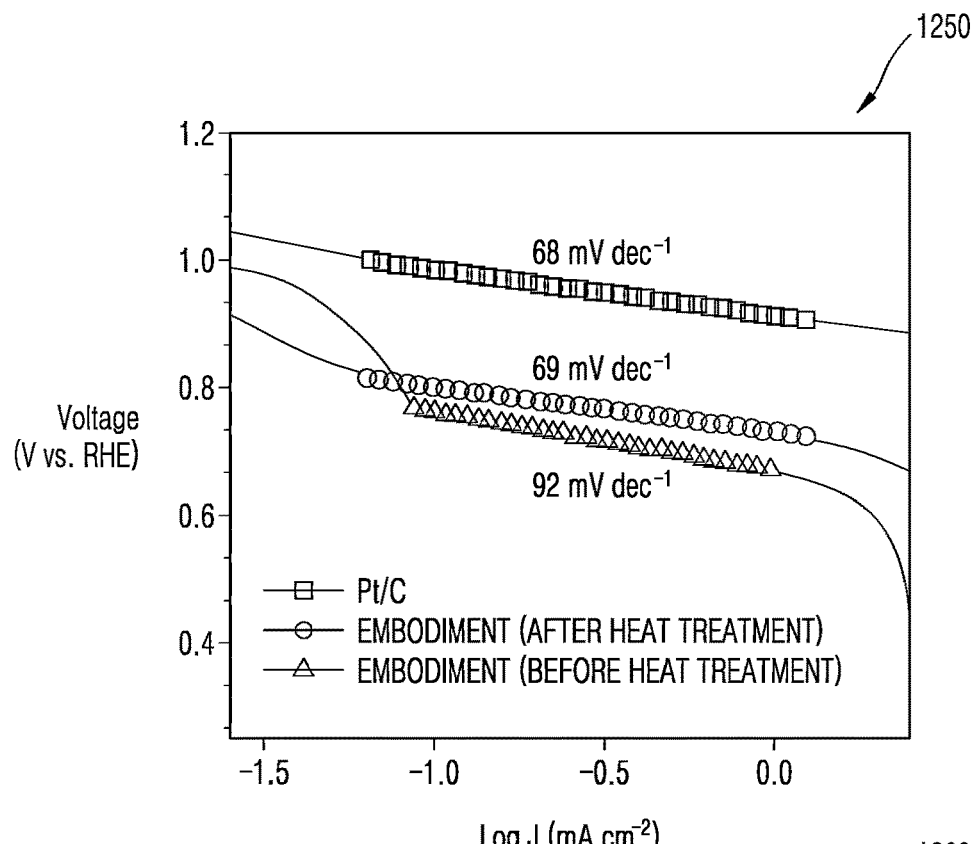
Figure 12C:
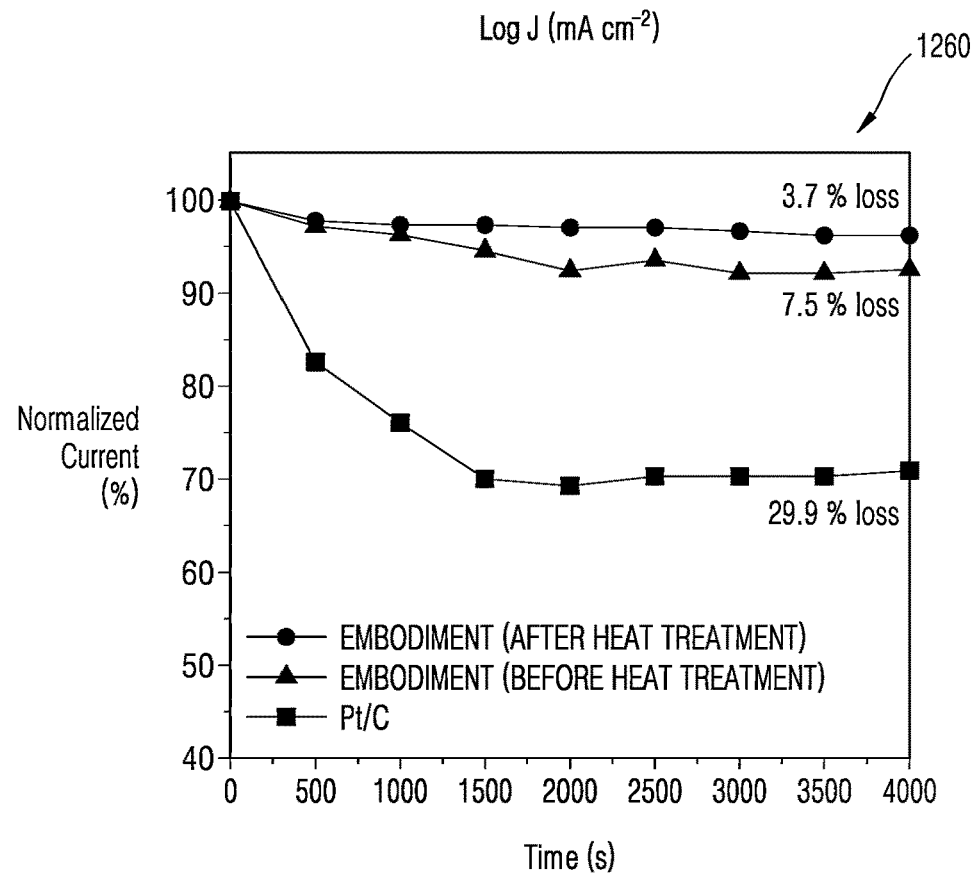
Figure 12D:
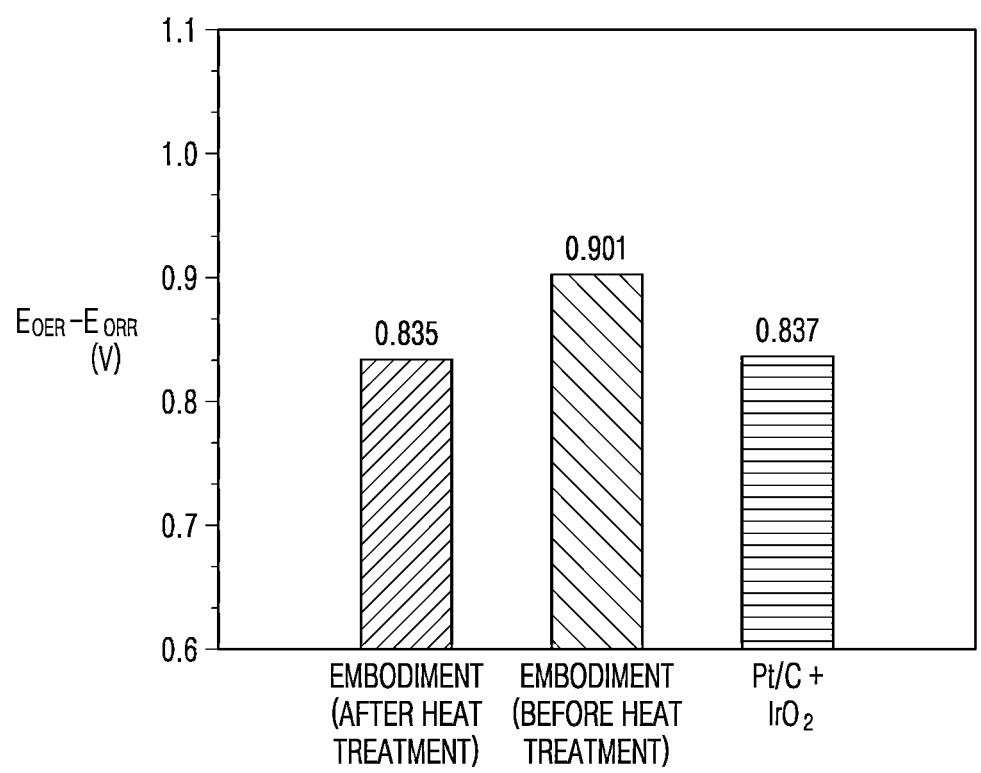

Graphs 1210 and 1220 are HER measurement results, and graphs 1230 and 1240 are OER measurement results. Graphs 1250 and 1260 are ORR measurement results, and FIG. 12D is $E_{OER}$-$E_{ORR}$ measurement results. HER, OER, ORR, and $E_{OER}$-$E_{ORR}$ were measured before and after heat treatment of the quantum dot catalyst including molybdenum, nickel, and sulfur, manufactured according to an embodiment, and as a comparative example, HER, OER, ORR, and $E_{OER}$-$E_{ORR}$ of Pt/C and $IrO_2$ that are commercially available catalysts were measured.

In addition, Table 1 shows HER, OER, ORR, and $E_{OER}$-$E_{ORR}$ values before and after heat treatment of the quantum dot catalyst including molybdenum, nickel and sulfur, manufactured according to an embodiment.

TABLE 1

| Performance Specimen | HER (mV/dec) | OER (mV/dec) | ORR (mV/dec) | $E_{OER}$ - $E_{ORR}$ (V) |
|---|---|---|---|---|
| Comparative example | 39 | 114 | 68 | 0.837 |
| Embodiment (before heat treatment) | 121 | 127 | 92 | 0.901 |
| Embodiment (after heat treatment) | 98 | 87 | 69 | 0.835 |

Referring to FIGS. 12A to 12D and Table 1, HER, OER, ORR, and $E_{OER}$-$E_{ORR}$ data before heat treatment of the quantum dot catalyst including molybdenum, nickel and sulfur, manufactured according to the embodiment, have significant differences compared to those of the comparative example (i.e., Pt/C and $IrO_2$). However, the heat-treated quantum dot catalyst including molybdenum, nickel, and sulfur has HER, OER, ORR, and $E_{OER}$-$E_{ORR}$ data that are almost similar to those of Pt/C and $IrO_2$ or have small differences compared to those of the non-heat-treated quantum dot catalyst. In addition, the heat-treated quantum dot catalyst has a higher stability than the non-heat-treated quantum dot catalyst.

The quantum dot catalyst including molybdenum, nickel, and sulfur according to the present disclosure may be synthesized in large quantities, and through heat treatment of the quantum dot catalyst, HER, OER, ORR, and $E_{OER}$-$E_{ORR}$ data almost similar to those of commercially available Pt/C and $IrO_2$ catalysts may be obtained. Therefore, the quantum dot catalyst including molybdenum, nickel, and sulfur according to the present disclosure may have high utility in the fields of energetic materials and catalyst chemistry.

Those of ordinary skill in the art related to the present embodiments will understand that the embodiments may be implemented in modified forms within a scope that does not depart from the essential characteristics of the above descriptions. Therefore, it should be understood that embodiments described herein should be considered in a descriptive sense only and not for purposes of limitation. The scope of the present disclosure is indicated in the claims rather than the foregoing descriptions, and all differences within the scope equivalent thereto should be construed as being included in the present disclosure.

The invention claimed is:

1. A method of manufacturing quantum dots, the method comprising:
    placing nickel powder having a certain particle size, a precursor material, and an organic solvent into a container;
    maintaining a pressure in the container at a certain value;
    synthesizing quantum dots by stirring the nickel powder, the precursor material, and the organic solvent in the container;
    heating the synthesized quantum dots to at least a first temperature for at least a first time under an argon atmosphere; and
    heat-treating the synthesized quantum dots at the at least the first temperature for a second time greater than the first time, under the argon atmosphere.

2. The method of claim 1, wherein the certain particle size is 10 μm or less.

3. The method of claim 1, wherein the certain pressure is 10 bar or more.

4. The method of claim 1, wherein the precursor material is ammonium tetrathiomolybdate (($NH_4$)$_2$$MoS_4$).

5. The method of claim 1, wherein the organic solvent is dimethylformamide (DMF).

6. The method of claim 1, wherein, in the synthesizing, the nickel powder, the precursor material, and the organic solvent in the container are stirred at a stirring speed of 200 rpm or more.

7. The method of claim 1, wherein the first time is 3 hours and the second time is 5 hours.

8. The method of claim 7, wherein the first temperature is 500° C.

* * * * *